(12) United States Patent
Gantman et al.

(10) Patent No.: US 9,411,765 B2
(45) Date of Patent: Aug. 9, 2016

(54) METHODS OF USING A PERIPHERAL COMPONENT INTERCONNECT EXPRESS (PCIE) DEVICE IN A VIRTUAL ENVIRONMENT

(71) Applicant: QUALCOMM Incorporated, San Diego, CA (US)

(72) Inventors: Alexander Gantman, Yokneam (IL); Yossef Tsfaty, Rishon le Zion (IL); Vladimir Kondratiev, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 14/136,180

(22) Filed: Dec. 20, 2013

(65) Prior Publication Data

US 2015/0178234 A1      Jun. 25, 2015

(51) Int. Cl.
*G06F 13/40* (2006.01)
*G06F 9/455* (2006.01)

(52) U.S. Cl.
CPC ........ *G06F 13/4022* (2013.01); *G06F 9/45545* (2013.01); *G06F 2213/0026* (2013.01)

(58) Field of Classification Search
CPC ............ G06F 13/4011; G06F 9/45545; G06F 2213/0026
USPC ................ 713/1, 2, 100; 710/8–10, 312, 313
See application file for complete search history.

(56) References Cited

U.S. PATENT DOCUMENTS

| | | | |
|---|---|---|---|
| 7,962,675 B1 | 6/2011 | Graham, III | |
| 8,249,089 B2 | 8/2012 | Saripalli | |
| 8,478,907 B1 | 7/2013 | Aloni | |
| 8,898,443 B2 * | 11/2014 | Reeves ................... | G06F 13/14 713/1 |
| 2012/0005691 A1 | 1/2012 | Wong et al. | |
| 2012/0159144 A1 | 6/2012 | Sengupta et al. | |

FOREIGN PATENT DOCUMENTS

WO        2012023150 A2      2/2012

OTHER PUBLICATIONS

Allenstew, "Partner & Customer Solutions Blog," WinHec 2006 Conference Virtualization Content, Apr. 6, 2006, Retrieved from the Internet <URL: http://blogs.technet.com/b/wincat/archive/2006/04/06/424510.aspx >, 3 Pages.
International Search Report and Written Opinion for PCT/US2014/071472, mailed Mar. 16, 2015, 12 pages.
Second Written Opinion for PCT/US2014/071472, mailed Dec. 3, 2015, 6 pages.
International Preliminary Report on Patentability for PCT/US2014/071472, mailed Mar. 7, 2016, 24 pages.

* cited by examiner

*Primary Examiner* — Tammara Peyton
(74) *Attorney, Agent, or Firm* — Withrow & Terranova, PLLC

(57) ABSTRACT

Methods of using a peripheral component interconnect express (PCIe) device in a virtual environment are disclosed. Two operating systems operate on a primary device. One operating system acts as a guest in a virtual environment within the primary device. A peripheral device is coupled to the primary device through a wireless connection. In an exemplary embodiment, the wireless connection is a PCIe bridge. The host operating system interfaces directly with the memory elements and hardware of the primary device. The guest operating system interoperates with the memory elements and hardware of the peripheral device. The use of the PCIe wireless link allows the guest operating system to interface with the elements of the peripheral device with relatively little latency.

22 Claims, 5 Drawing Sheets

METHODS OF USING A PERIPHERAL COMPONENT INTERCONNECT EXPRESS (PCIE) DEVICE IN A VIRTUAL ENVIRONMENT

BACKGROUND

I. Field of the Disclosure

The technology of the disclosure relates generally to virtual environments within computing devices.

II. Background

Computing devices have become common throughout society. While a handful of operating systems are used for these devices, the fact remains that there are a plurality of essentially mutually exclusive operating systems available for use on computing devices. There may be situations where a user of a computing device may want to operate multiple operating systems concurrently.

One solution for allowing a user to operate multiple operating systems concurrently is the use of a virtualized environment. One successful commercial implementation of this concept is APPLE's ability to run a WINDOWS environment concurrently with the APPLE operating system. While APPLE has shown that virtual environments for WINDOWS are commercially viable, this option is currently limited to desk top machines and lap tops designed to accommodate the virtual environment.

Other computing devices, and particularly mobile computing devices, do not have the benefit of the APPLE architecture. Even APPLE's iPHONE® with its myriad capabilities does not provide effective virtual environments. If there were more virtual environment options, end users would have more flexibility in how they used such mobile devices.

SUMMARY OF THE DISCLOSURE

Embodiments disclosed in the detailed description include methods of using a peripheral component interconnect express (PCIe) device in a virtual environment. Exemplary embodiments of the present disclosure relate to techniques that allow two operating systems to operate on a primary device. One operating system acts as a guest in a virtual environment within the primary device. A peripheral device is coupled to the primary device through a wireless connection. In an exemplary embodiment, the wireless connection is a PCIe bridge. The host operating system interfaces directly with the memory elements and hardware of the primary device. The guest operating system interoperates with the memory elements and hardware of the peripheral device. The use of the PCIe wireless link allows the guest operating system to interface with the elements of the peripheral device with relatively little latency.

A second embodiment of the present disclosure relates to the mechanism through which the virtual environment is created. In particular, a virtualization table will translate the actual physical address in host memory into another physical memory in the peripheral device. This way, once the address is delegated, the virtual environment client will connect to the remote hardware directly.

In this regard in one embodiment, a computing system is disclosed. The computing device comprises a peripheral device comprising a peripheral memory component and a peripheral wireless transceiver. The computing system further comprises a primary device. The primary device comprises a user interface and a primary memory element. The primary device also comprises a primary wireless transceiver configured to communicate with the peripheral wireless transceiver so that the primary device and the peripheral device are communicatively coupled. The primary device also comprises a control system. The control system is configured to support two operating systems such that a first of the two operating systems is configured to interact with the primary memory element and not the peripheral memory element and a second of the two operating systems is configured to be a virtual operating system and interact with the peripheral memory element through the wireless transceivers.

In another embodiment, a computing system is disclosed. The computing system comprises a primary device. The primary device comprises a user interface. The primary device also comprises a primary memory element. The primary device also comprises a primary wireless transceiver configured to communicate with a peripheral wireless transceiver in a peripheral device so that the primary device and the peripheral device are communicatively coupled. The primary device also comprises a control system. The control system is configured to support two operating systems such that a first of the two operating systems is configured to interact with the primary memory element and not a peripheral memory element and a second of the two operating systems is configured to be a virtual operating system and interact with the peripheral memory element through the wireless transceivers.

In another embodiment, a computing system is disclosed. The computing system comprises a primary device. The primary device comprises a user interface. The primary device also comprises a primary memory element. The primary device also comprises a primary wire based PCIe bridge configured to communicate with a peripheral switch in a peripheral device so that the primary device and the peripheral device are communicatively coupled. The primary device also comprises a control system. The control system is configured to support two operating systems such that a first of the two operating systems is configured to interact with the primary memory element and not a peripheral memory element and a second of the two operating systems is configured to be a virtual operating system and interact with the peripheral memory element through the PCIe bridge.

In another embodiment, a method of using a peripheral device with mobile terminal is disclosed. The method comprises providing a wireless PCIe bridge in the mobile terminal. The method also comprises wirelessly connecting the PCIe bridge to a wireless PCIe transceiver in the peripheral device. The method also comprises operating a first operating system on the mobile terminal such the first operating system uses memory resources only within the mobile terminal. The method also comprises operating a second operating system within a virtual environment on the mobile terminal such that the second operating system uses memory resources of the peripheral device through the wireless PCIe bridge.

DETAILED DESCRIPTION

Figure 1:
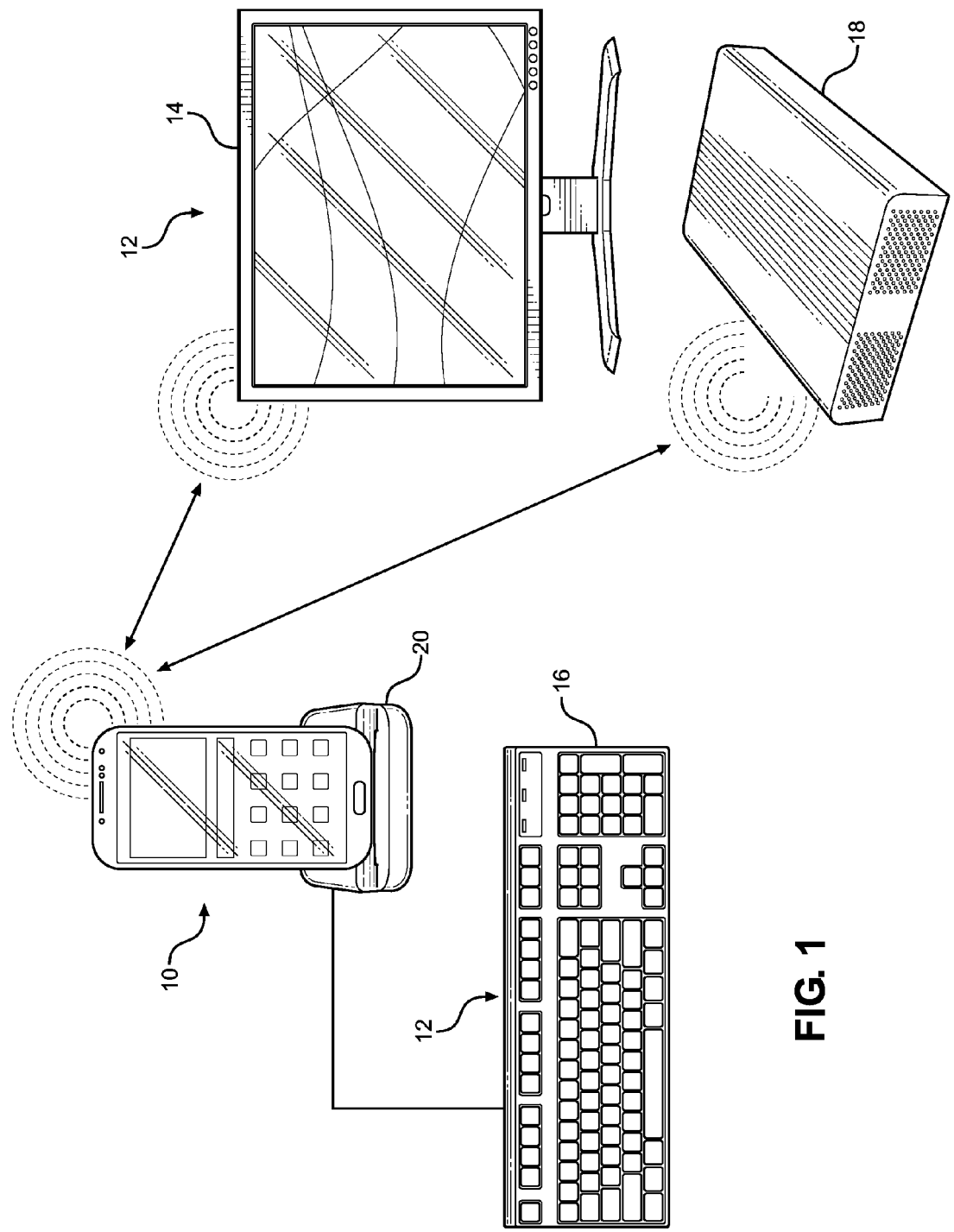
FIG. 1 is a perspective view of a mobile terminal with peripheral devices which may communicate according to exemplary embodiments of the present disclosure.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include methods of using a peripheral component interconnect express (PCIe) device in a virtual environment. Exemplary embodiments of the present disclosure relate to techniques that allow two operating systems to operate on a primary device. One operating system acts as a guest in a virtual environment within the primary device. A peripheral device is coupled to the primary device through a wireless connection. In an exemplary embodiment, the wireless connection is a PCIe bridge. The host operating system interfaces directly with the memory elements and hardware of the primary device. The guest operating system interoperates with the memory elements and hardware of the peripheral device. The use of the PCIe wireless link allows the guest operating system to interface with the elements of the peripheral device with relatively little latency.

A second embodiment of the present disclosure relates to the mechanism through which the virtual environment is created. In particular, a virtualization table will translate the actual physical address in host memory into another physical memory in the peripheral device. This way, once the address is delegated, the virtual environment client will connect to the remote hardware directly.

Before addressing exemplary embodiments of the present disclosure, it is worth noting that the increasing prevalence of mobile terminals such as smart phones and tablets has created new opportunities as people continue to think of new ways to use these devices. For example, the relatively small screen size of a smart phone such as the iPHONE® means that some people strain to read the contents of the display. Even the larger screen of tablet style devices like the KINDLE™ or iPAD™ are still substantially smaller than traditional television screens or desktop computer monitors. Accordingly, efforts have been made to make such mobile terminals interoperate with various peripheral devices such as large screen monitors. However, to date, the interoperation of such peripheral monitors treats the monitor as a slave device that merely duplicates the desktop of the mobile terminal (e.g., the wallpaper and icons of the smart phone are displayed without change on the monitor). In many instances, the operating system of the smart phone is not optimized to use the improved resolution and size of such peripheral monitors.

Even with the availability of peripheral devices such as keyboards and monitors, the functionality of the peripheral device is still limited by the functionality of the underlying operating system of the mobile terminal. That is, some operating systems such as UBUNTU may be optimized to display video content, while others may be optimized to facilitate other forms of processing. One solution is to run a second operating system in a virtual environment on the mobile terminal. However, current limitations that treat the monitor as a slave device of the mobile terminal mean that the second operating system cannot fully utilize the resources of the peripheral device.

Exemplary embodiments of the present disclosure propose to connect a peripheral device to a primary or host computing device with two operating systems. The first operating system is the native or default operating system, and the second operating system is a guest operating system that operates in a virtual environment within the host computing device. A virtualization table redirects instructions from the second operating system to memory elements within the peripheral device over a PCIe connection. In an exemplary embodiment, the PCIe connection is a WiGig connection operating at approximately 60 GHz. The speed of such a connection means that there is little latency. In this manner, an operating system optimized for operating the computing device may be the native operating system and the virtual operating system may be optimized to use the peripheral device. For example, an android operating system may be native to a smart phone and UBUNTU be the virtual operating system to show video on a peripheral monitor.

While the embodiments of the present disclosure are applicable to a variety of computing devices, an exemplary embodiment is a mobile terminal such as a smart phone, tablet, or the like. Thus, a mobile terminal 10 is illustrated in FIG. 1 with peripherals 12. In an exemplary embodiment the mobile terminal 10 is a smart phone such as the iPHONE® or SAMSUNG® GALAXY™. Peripherals 12 may be a monitor 14 (sometimes referred to herein as a display), a keyboard 16, a USB drive 18, or the like. In an exemplary embodiment, the mobile terminal 10 wirelessly communicates with the peripherals 12 as will be explained in greater detail below. Alternatively, the mobile device 10 may be coupled to a docking station 20 and the docking station 20 may be coupled to a peripheral 12 (e.g., the keyboard 16) through a wire.

Figure 2:
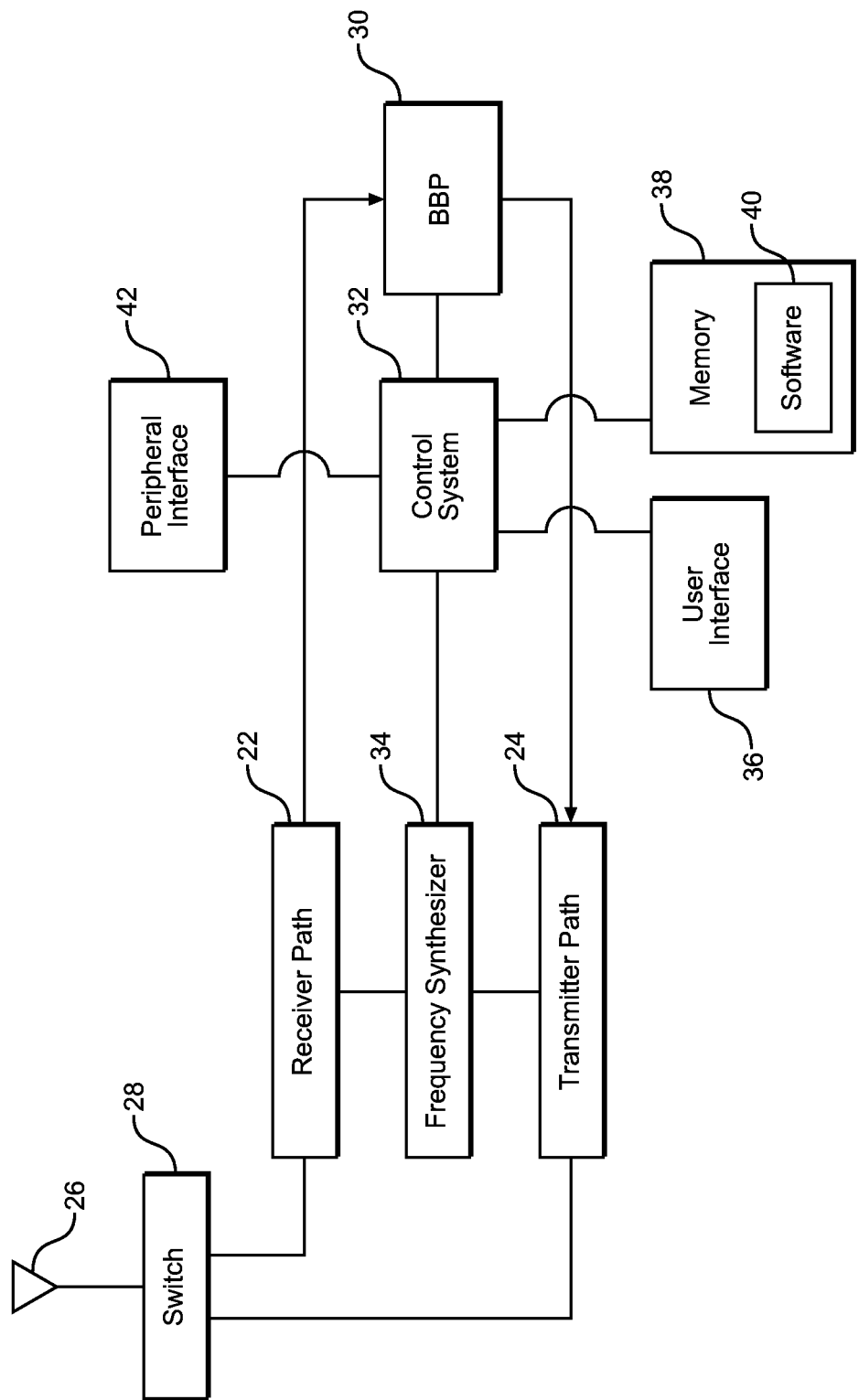
FIG. 2 is a block diagram of components of the mobile terminal of FIG. 1.

With reference to FIG. 2, a block diagram of some of the elements of the mobile terminal 10 is illustrated. The mobile terminal 10 may include a receiver path 22, a transmitter path 24, an antenna 26, a switch 28, a baseband processor (BBP) 30, a control system 32, a frequency synthesizer 34, a user interface 36 and memory 38 with software 40 stored therein.

The receiver path 22 receives information bearing RF signals from one or more remote transmitters provided by a base station (not shown). A low noise amplifier (not shown) amplifies the signal. A filter (not shown) minimizes broadband interference in the received signal, while down conversion and digitization circuitry (not shown) down converts the filtered, received signal to an intermediate or baseband frequency signal, which is then digitized into one or more digital streams. The receiver path 22 typically uses one or more mixing frequencies generated by the frequency synthesizer 34. The BBP 30 processes the digitized received signal to extract the information or data bits conveyed in the signal. As such, the BBP 30 is typically implemented in one or more digital signal processors (DSPs).

With continued reference to FIG. 2, on the transmit side, the BBP 30 receives digitized data, which may represent voice, data, or control information, from the control system 32, which it encodes for transmission. The encoded data is output to the transmitter path 24, where it is used by a modulator (not shown) to modulate a carrier signal at a desired transmit frequency. An RF power amplifier (not shown) amplifies the modulated carrier signal to a level appropriate for transmission, and delivers the amplified and modulated carrier signal to the antenna 26 through the switch 28.

With continued reference to FIG. 2, a user may interact with the mobile terminal 10 via the user interface 36, such as a microphone, a speaker, a keypad, and a display. Audio information encoded in the received signal is recovered by the BBP 30, and converted into an analog signal suitable for driving the speaker. The keypad and display enable the user to interact with the mobile terminal 10. For example, the keypad and display may enable the user to input numbers to be dialed, access address book information, or the like, as well as monitor call progress information. In addition to the antenna 26, the mobile terminal 10 may have a peripheral interface 42, which, in an exemplary embodiment, is a PCIe interface and more particularly, a wireless interface, and more particularly, operates at approximately 60 GHz according to the WiGig protocol within the PCIe protocol. While a WiGig interface is contemplated, the present disclosure is not limited to such and other peripheral interfaces are within the scope of the present disclosure. However, the WiGig interface is believed to provide the lowest latency for the activities disclosed herein.

With continued reference to FIG. 2, the memory 38 may have software 40 therein as noted above. The software 40 may include applications and a native operating system optimized to provide functionality to the mobile terminal 10. In an exemplary embodiment, the software 40 also has a guest operating system that operates within a virtual environment as better explained with reference to FIG. 3.

Figure 3:
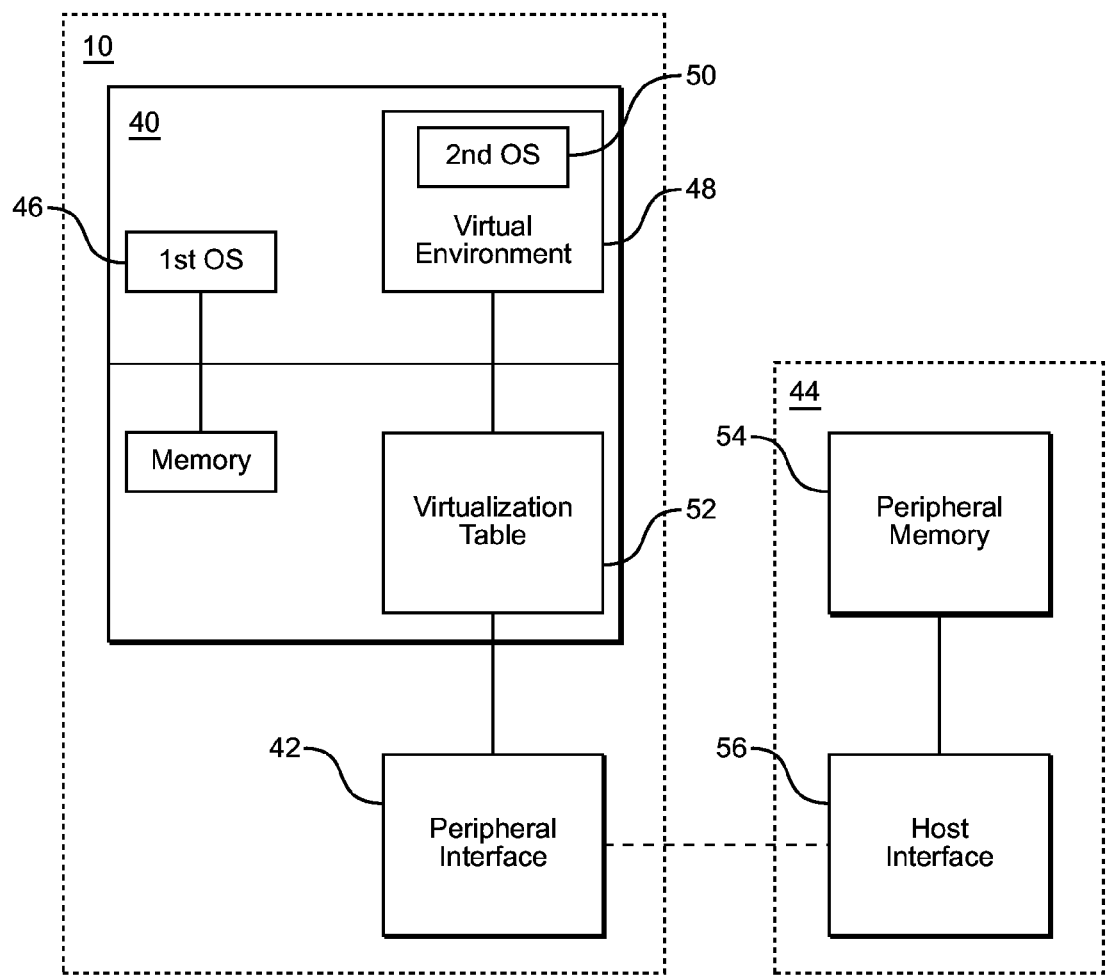
FIG. 3 is a block diagram of an exemplary embodiment of a second operating system within a mobile terminal communicating with a peripheral device according to the present disclosure.

In this regard, FIG. 3 illustrates a block diagram of the mobile terminal 10 coupled to a peripheral 44. The mobile terminal 10 has a native or first operating system 46 within software 40. The software 40 further supports a virtual environment 48 with a second or guest operating system 50 active within the virtual environment 48. In an exemplary embodiment, the first operating system 46 is an android operating system and the second operating system 50 is a full screen operating system such as UBUNTU, Chrome OS, or Debian. The first operating system 46 interoperates with the memory 38 as is well understood. Also within the memory 38 is a virtualization table 52 that translates direct memory access (DMA) requests from the second operating system 50. That is, the second operating system 50 believes that it is communicating with local memory at a particular memory address, but in reality, the virtual environment 48 with the virtualization table 52 redirects such communications according to the predefined rules of the virtual environment. In particular, the virtualization table 52 does not merely map the DMA requests to other memory within the mobile terminal 10 but, in exemplary embodiments of the present disclosure, maps the DMA requests to peripheral memory 54 within the peripheral 44. That is, the control system 32 through the virtual environment 48 allows the second operating system 50 to control the peripheral 44 without the overlay of the first operating system 46. The peripheral 44 includes a host interface 56 which is configured to receive communications from the peripheral interface 42 of the mobile terminal 10. Thus, in an exemplary embodiment, the host interface 56 is a PCIe interface operating according to the WiGig protocol at approximately 60 GHz. Note further that the first operating system 46 does not interface with the peripheral 44 except to the extent that it controls the virtual environment 48. Likewise, the second operating system 50 does not interact with the memory 38 of the mobile terminal except to the extent needed to access the virtualization table 52.

While the wireless interfaces of the WiGig protocol provide minimal latency and seamless extension of the virtual experience for the second operating system 50, the present disclosure is not so limited. In another exemplary embodiment, the wireless link is replaced by a wirebased link such as between the docking station 20 and the keyboard 16 (FIG. 1).

Figure 4:
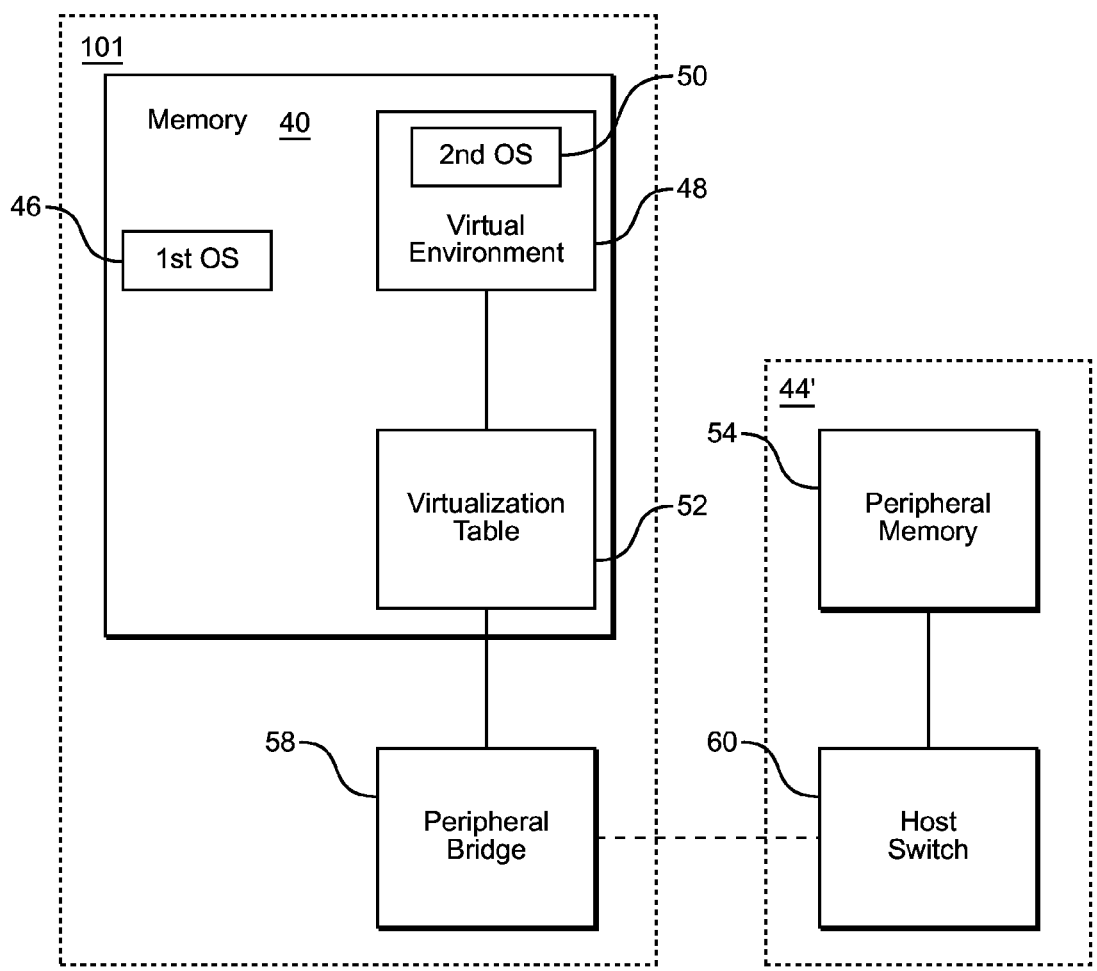
FIG. 4 is a block diagram of an exemplary embodiment of a second operating system within a computing device communicating with a peripheral device according to the present disclosure.

In this regard, FIG. 4 illustrates a mobile terminal 10' substantially similar to the mobile terminal 10 of FIG. 3, but instead of peripheral interface 42, the mobile terminal 10' has a peripheral bridge 58, which in an exemplary embodiment, is a wirebased PCIe bridge. Likewise, the peripheral 44' has a host switch 60, which in an exemplary embodiment, is a PCIe switch. While this PCIe bridge and switch are able to effectuate the present disclosure, such arrangement has more latency than the wireless embodiment described above with respect to FIG. 3.

Figure 5:
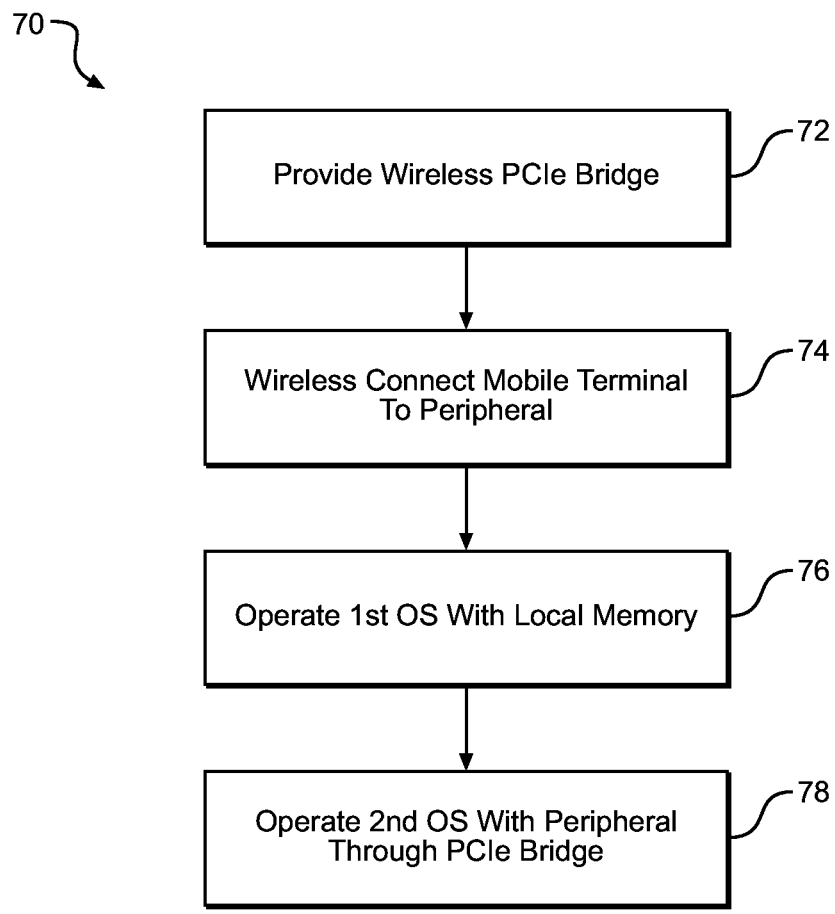
FIG. 5 is a flow chart of an exemplary embodiment of a process of the present disclosure.

As a further summary, FIG. 5 illustrates a flow chart of an exemplary process 70 of the present disclosure. The process 70 begins with providing a wireless PCIe bridge (i.e., peripheral interface 42) in the mobile terminal 10 (block 72). The mobile terminal 10 wirelessly connects to a peripheral 44 (block 74) such as through the PCIe WiGig standard. The first operating system 46 operates using the memory 38 (block 76) and the second operating system 50 operates using the peripheral through the PCIe bridge (block 78). While process 70 assumes a wireless connection, another embodiment for a wirebased system is also within the scope of the present disclosure (e.g., the process 70 may be modified to work with the mobile terminal 10').

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A computing system comprising:
   a peripheral device comprising a peripheral memory element and a peripheral wireless transceiver; and
   a primary device comprising:
      a user interface;
      a primary memory element;
      a primary wireless transceiver configured to communicate with the peripheral wireless transceiver so that the primary device and the peripheral device are communicatively coupled; and
      a control system configured to:
         support two operating systems such that a first operating system of the two operating systems is configured to interact with the primary memory element and not the peripheral memory element and a second operating system of the two operating systems is configured to be a virtual operating system and interact with the peripheral memory element through a virtual environment and the wireless transceivers, wherein the virtual environment maps direct memory access requests of the second operating system to the peripheral memory element.

2. The computing system of claim 1, wherein the primary device comprises a mobile terminal.

3. The computing system of claim 2, wherein the peripheral device comprises a monitor.

4. The computing system of claim 1, wherein the first operating system comprises an android operating system and the second operating system comprises a UBUNTU operating system.

5. The computing system of claim 1, wherein the primary wireless transceiver comprises a transceiver operating under a peripheral component interconnect express (PCIe) standard.

6. The computing system of claim 1, wherein the primary wireless transceiver operates at approximately 60 GHz.

7. A computing system comprising:
 a primary device comprising:
  a user interface;
  a primary memory element;
  a primary wireless transceiver configured to communicate with a peripheral wireless transceiver in a peripheral device so that the primary device and the peripheral device are communicatively coupled; and
  a control system configured to:
   support two operating systems such that a first operating system of the two operating systems is configured to interact with the primary memory element and not a peripheral memory element and a second operating system of the two operating systems is configured to be a virtual operating system and interact with the peripheral memory element through a virtual environment and the wireless transceivers, wherein the virtual environment maps direct memory access requests of the second operating system to the peripheral memory element.

8. The computing system of claim 7, wherein the primary device comprises a mobile terminal.

9. The computing system of claim 8, wherein the mobile terminal is configured to operate with a monitor.

10. The computing system of claim 7, wherein the first operating system comprises an android operating system and the second operating system comprises a UBUNTU operating system.

11. The computing system of claim 7, wherein the primary wireless transceiver comprises a transceiver operating under a peripheral component interconnect express (PCIe) standard.

12. The computing system of claim 7, wherein the primary wireless transceiver operates at approximately 60 GHz.

13. The computing system of claim 7, wherein the control system is configured to use a virtualization table to map elements in the peripheral device to commands of the second operating system.

14. A computing system comprising:
 a primary device comprising:
  a user interface;
  a primary memory element;
  a primary wire based peripheral component interconnect express (PCIe) bridge configured to communicate with a peripheral switch in a peripheral device so that the primary device and the peripheral device are communicatively coupled; and
  a control system configured to:
   support two operating systems such that a first operating system of the two operating systems is configured to interact with the primary memory element and not a peripheral memory element and a second operating system of the two operating systems is configured to be a virtual operating system and interact with the peripheral memory element through a virtual environment and the primary wire based PCIe bridge, wherein the virtual environment maps direct memory access requests of the second operating system to the peripheral memory element.

15. The computing system of claim 14, wherein the first operating system comprises an android operating system and the second operating system comprises a UBUNTU operating system.

16. The computing system of claim 14, wherein the control system is configured to use a virtualization table to map elements in the peripheral device to commands of the second operating system.

17. A method of using a peripheral device with a mobile terminal, comprising:
 providing a wireless peripheral component interconnect express (PCIe) bridge in the mobile terminal;
 wirelessly connecting the wireless PCIe bridge to a wireless PCIe transceiver in the peripheral device;
 operating a first operating system on the mobile terminal such that the first operating system uses memory resources only within the mobile terminal; and
 operating a second operating system within a virtual environment on the mobile terminal such that the second operating system uses memory resources of the peripheral device through the wireless PCIe bridge, wherein the virtual environment maps direct memory access requests of the second operating system to the memory resources of the peripheral device.

18. The method of claim 17, wherein the wireless PCIe bridge operates at approximately 60 GHz.

19. The method of claim 17, wherein the wireless PCIe bridge operates according to a WiGig standard.

20. The method of claim 17, wherein the first operating system comprises an android operating system and the second operating system comprises a UBUNTU operating system.

21. The method of claim 17, wherein the peripheral device comprises a monitor.

22. The method of claim 17, wherein operating the second operating system comprises using a virtualization table to redirect memory access requests to memory elements in the peripheral device.

* * * * *